US010628308B2

(12) United States Patent
Desai et al.

(10) Patent No.: US 10,628,308 B2
(45) Date of Patent: Apr. 21, 2020

(54) DYNAMIC ADJUSTMENT OF MEMORY CHANNEL INTERLEAVE GRANULARITY

(71) Applicant: QUALCOMM INCORPORATED, San Diego, CA (US)

(72) Inventors: Kunal Desai, Bangalore (IN); Satyaki Mukherjee, Bangalore (IN); Abhinav Mittal, Pune (IN); Siddharth Kamdar, Bangalore (IN); Umesh Rao, Bangalore (IN); Vinayak Shrivastava, Bangalore (IN)

(73) Assignee: Qualcomm Incorporated, San Diego, CA (US)

( * ) Notice: Subject to any disclaimer, the term of this patent is extended or adjusted under 35 U.S.C. 154(b) by 57 days.

(21) Appl. No.: 15/988,863

(22) Filed: May 24, 2018

(65) Prior Publication Data
US 2019/0361807 A1 Nov. 28, 2019

(51) Int. Cl.
*G06F 12/06* (2006.01)
*G06F 12/10* (2016.01)

(52) U.S. Cl.
CPC .......... *G06F 12/0607* (2013.01); *G06F 12/10* (2013.01); *G06F 2212/1008* (2013.01); *G06F 2212/657* (2013.01)

(58) Field of Classification Search
CPC .............. G06F 12/0607; G06F 12/10; G06F 2212/1008; G06F 2212/657
See application file for complete search history.

(56) References Cited

U.S. PATENT DOCUMENTS

| | | | |
|---|---|---|---|
| 5,802,341 A * | 9/1998 | Kline | G06F 12/1009 711/209 |
| 7,979,648 B2 | 7/2011 | Saxe et al. | |
| 9,405,700 B2 | 8/2016 | Wingard | |
| 9,612,648 B2 | 4/2017 | Chun et al. | |
| 2008/0320254 A1* | 12/2008 | Wingard | G06F 12/0607 711/157 |
| 2011/0320751 A1 | 12/2011 | Wang et al. | |
| 2012/0054455 A1* | 3/2012 | Wang | G06F 12/0607 711/157 |
| 2017/0108911 A1* | 4/2017 | Chun | G06F 12/0607 |

* cited by examiner

*Primary Examiner* — Aracelis Ruiz
(74) *Attorney, Agent, or Firm* — Smith Tempel Blaha LLC

(57) ABSTRACT

Systems, methods, and computer programs are disclosed for dynamically adjusting memory channel interleave granularity. An embodiment of a system comprises a plurality of memory clients, a memory management unit (MMU), and an address translator. The plurality of memory clients are electrically coupled to each of a plurality of memory channels via an interconnect. The MMU is configured to receive a request for a memory allocation request for one or more memory pages from one of the plurality of memory client and, in response, select one of a plurality of interleave granularities for the one or more memory pages. The address translator is configured to translate a physical address to interleave memory data associated with the one or more memory pages at the selected interleave granularity.

27 Claims, 8 Drawing Sheets

| PBHA OR HIGH PA CODING | INTERLEAVE GRANULARITY | ADDRESS MANIPULATION |
|---|---|---|
| 00 | 256 B | TRANS_PA = PA (NO MANIPULATION) |
| 01 | 512 B | TRANS_PA[10:8] = PA[11:9]; TRANS_PA[11] = PA[8]; OTHER BITS SAME |
| 10 | 1 kB | TRANS_PA[10:8] = PA[12:10]; TRANS_PA[12:11] = PA[9:8]; OTHER BITS SAME |
| 11 | 2 kB | TRANS_PA[10:8] = PA[13:11]; TRANS_PA[13:11] = PA[10:8]; OTHER BITS SAME |

FIG. 5

DYNAMIC ADJUSTMENT OF MEMORY CHANNEL INTERLEAVE GRANULARITY

DESCRIPTION OF THE RELATED ART

Portable computing devices (e.g., cellular telephones, smart phones, tablet computers, portable game consoles, wearable devices, and other battery-powered devices) and other computing devices continue to offer an ever-expanding array of features and services, and provide users with unprecedented levels of access to information, resources, and communications. To keep pace with these service enhancements, such devices have become more powerful and more complex. Portable computing devices now commonly include a system on chip (SoC) comprising a plurality of processing devices embedded on a single substrate. The SoC processing devices may be referred to as masters or memory clients that read data from and store data in a system memory electrically coupled to the SoC (e.g., double data rate (DDR) dynamic random-access memory (DRAM)).

SoCs are demanding increasing power performance and capacity from DDR memory devices. These demands lead to both faster clock speeds and wide busses, which are then typically partitioned into multiple, narrower memory channels in order to remain efficient. Multiple memory channels may be address-interleaved together to uniformly distribute the memory traffic across memory devices and optimize performance. Memory data is uniformly distributed by assigning addresses to alternating memory channels. This technique is commonly referred to as fixed channel interleaving.

Existing fixed memory channel interleaving techniques require all of the channels to be activated. For high performance use cases, this is intentional and necessary to achieve the desired level of performance. For low performance use cases, however, this leads to wasted power and no meaningful benefit. Accordingly, there remains a need in the art for improved systems and methods for providing memory channel interleaving.

SUMMARY OF THE DISCLOSURE

Systems, methods, and computer programs are disclosed for dynamically adjusting memory channel interleave granularity. An embodiment of a system comprises a plurality of memory clients, a memory management unit (MMU), and an address translator. The plurality of memory clients are electrically coupled to each of a plurality of memory channels via an interconnect. The MMU is configured to receive a request for a memory allocation request for one or more memory pages from one of the plurality of memory client and, in response, select one of a plurality of interleave granularities for the one or more memory pages. The address translator is configured to translate a physical address to interleave memory data associated with the one or more memory pages at the selected interleave granularity.

An embodiment of a method for dynamically adjusting memory channel interleave granularity comprises initiating a memory allocation for one or more memory pages. One of a plurality of interleave granularities is selected for the one or more memory pages. The selected interleave granularity is encoded in one or more page descriptors associated with the one or more memory pages. A physical address is translated to interleave memory data associated with the one or more memory pages at the selected interleave granularity.

BRIEF DESCRIPTION OF THE DRAWINGS

In the Figures, like reference numerals refer to like parts throughout the various views unless otherwise indicated. For reference numerals with letter character designations such as "102A" or "102B", the letter character designations may differentiate two like parts or elements present in the same Figure. Letter character designations for reference numerals may be omitted when it is intended that a reference numeral to encompass all parts having the same reference numeral in all Figures.

FIG. 5 is a table illustrating an exemplary embodiment for manipulating physical address bits to implement a plurality of encoded interleave granularities.

DETAILED DESCRIPTION

Figure 1:
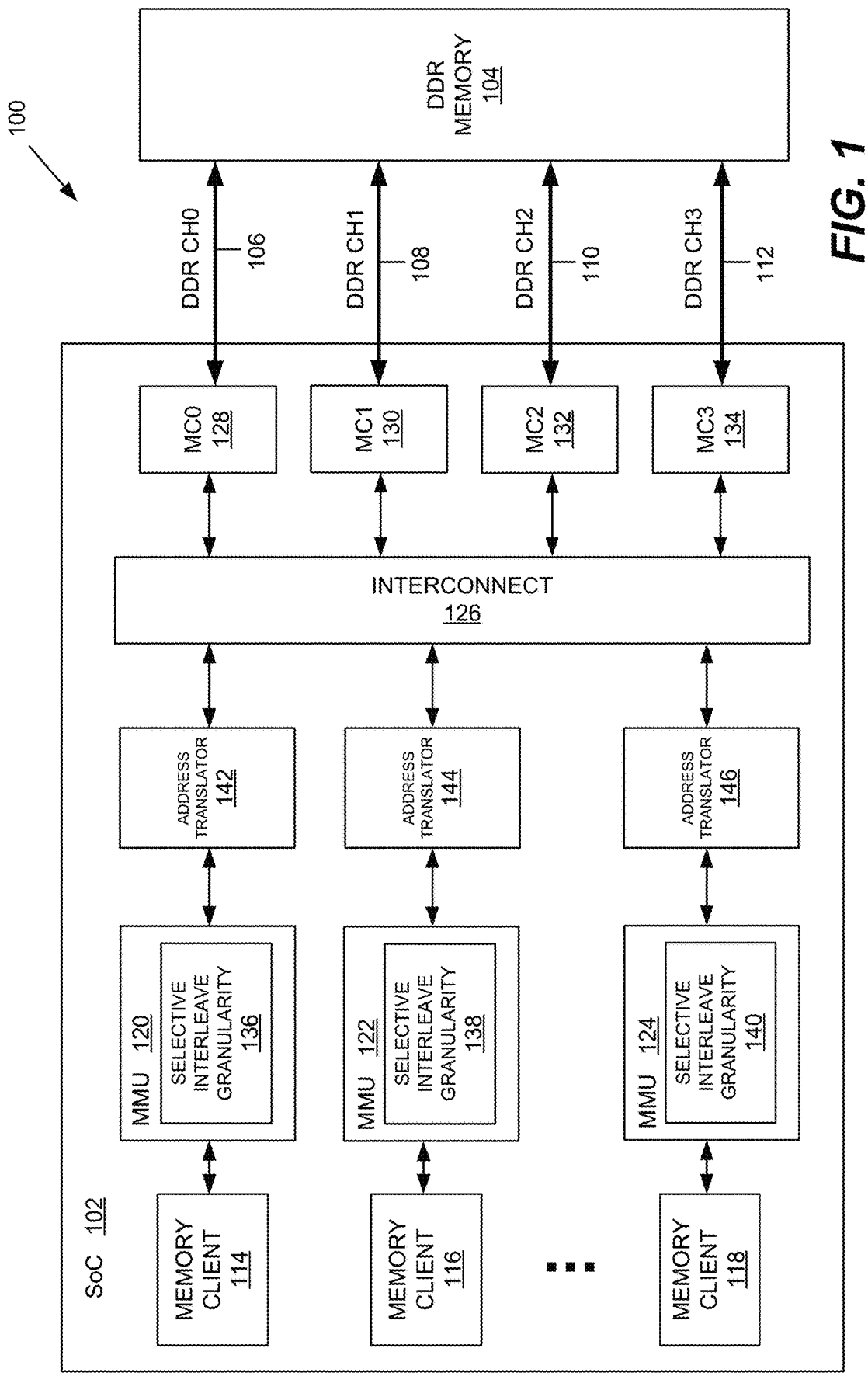
FIG. 1 is a block diagram illustrating an exemplary embodiment of a system on chip (SoC) for dynamically adjusting memory channel interleave granularity.

The word "exemplary" is used herein to mean "serving as an example, instance, or illustration." Any aspect described herein as "exemplary" is not necessarily to be construed as preferred or advantageous over other aspects.

The terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes, such as in accordance with a signal having one or more data packets (e.g., data from one component interacting with another component in a local system, distributed system, and/or across a network such as the Internet with other systems by way of the signal).

The term "application" or "image" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files that need to be accessed.

The term "task" may include a process, a thread, or any other unit of execution in a device.

The term "virtual memory" refers to the abstraction of the actual physical memory from the application or image that is referencing the memory. A translation or mapping may be used to convert a virtual memory address to a physical memory address. The mapping may be as simple as 1-to-1 (e.g., physical address equals virtual address), moderately complex (e.g., a physical address equals a constant offset from the virtual address), or the mapping may be complex (e.g., every 4 KB page mapped uniquely). The mapping may be static (e.g., performed once at startup), or the mapping may be dynamic (e.g., continuously evolving as memory is allocated and freed).

In this description, the terms "communication device," "wireless device," "wireless telephone", "wireless communication device," and "wireless handset" are used interchangeably. With the advent of third generation ("3G"), fourth generation ("4G"), and fifth generation ("5G") wireless technology, greater bandwidth availability has enabled more portable computing devices with a greater variety of wireless capabilities. Therefore, a portable computing device may include a smart phone, a cellular telephone, a navigation device, a game console, or a hand-held computer with a wireless connection or link.

FIG. 1 illustrates an embodiment of a system 100 for dynamically adjusting memory channel interleave granularity on a system on chip (SoC) 102. It should be appreciated that the dynamic adjustment of memory channel interleave granularity described herein may provide various advantages over existing multi-channel SoC solutions.

As known in the art, existing SoCs may include a plurality of memory clients (e.g., central processing unit(s) (CPUs), graphics processing units (GPUs), digital signal processor(s), etc.) that may access a plurality of memory channels for performance reasons. Fixed interleaving is typically performed at a predetermined interleave boundary or granularity (e.g., 256 B) to each of the memory channels irrespective of performance requirements, bandwidth requirements, memory data access sizes, etc. For example, a memory client may generate a memory transaction (either read or write). A memory management unit translates the incoming virtual address (VA) to a physical address (PA). A memory interconnect or memory network on chip (MNoC) sends the transaction to one of the memory channels of a memory controller depending on a physical address value. This process is referred to as fixed channel interleaving and helps to improve memory bandwidth & utilization. The MNoC may implement channel interleaving at a fixed sized boundary (e.g., 256 B) based on bits [10:8] of the PA. For example, PA[10:8] having the value "000" may map to a memory controller for a first memory channel (MC0). PA[10:8] having the value "001" may map to a memory controller for a second memory channel (MC1), and so on. Fixed interleaving may help high-bandwidth masters, such as, for example, a CPU or GPU, and efficiently balance traffic across memory channels. It should be appreciated, however, that fixed interleaving may result in low-bandwidth memory clients accessing/activating all of the memory channels for relatively small data chunks, which results in wasted power/energy.

Referring to FIG. 1, the system 100 enables the dynamic adjustment of the memory channel interleave granularity applied to memory transactions initiated by any of a plurality of processing devices residing on the SoC 102. As illustrated in FIG. 1, the SoC 102 comprises a plurality of processing devices 114, 116, and 118 (referred to as "memory clients" or "masters") that access an off-chip system memory via a memory interconnect 126. The processing devices 114, 116, and 118 may comprise any processing device that accesses the off-chip system memory via memory reads and/or writes. The system memory may be implemented with various types of memory, such as, for example, volatile memory. In the embodiment of FIG. 1, the system memory comprises dynamic random access memory (DRAM), an example of which is double data rate DRAM memory 104. As known in the art, to provide improved memory performance, DDR memory 104 may be accessed via a plurality of memory channels. FIG. 1 illustrates four DDR channels (CH0, CH1, CH2, CH3) although any number of channels may be provided to yield desirable performance specifications of the system 100.

Each DDR channel comprises a connection or bus between DDR memory 104 and a corresponding memory controller on SoC 102. For example, DDR CH0 is accessed via a memory controller 128 (MC0) electrically coupled to DDR memory 104 via DDR bus 106. DDR CH1 is accessed via a memory controller 130 (MC1) electrically coupled to DDR memory 104 via DDR bus 108. DDR CH2 is accessed via a memory controller 132 (MC2) electrically coupled to DDR memory 104 via DDR bus 110. DDR CH3 is accessed via a memory controller 134 (MC3) electrically coupled to DDR memory 104 via DDR bus 112.

It should be appreciated that the SoC processing devices 114, 116, and 118 may be categorized according to their respective memory performance requirements or specifications (e.g., memory bandwidth, memory footprint, etc.) as being "high performance masters" or "low performance masters". For example, processing devices such as a central processing unit (CPU), a graphics processing unit (GPU), and a Peripheral Component Interconnect Express (PCIe) controller may be designated with a "high performance" classification, whereas relatively low performance devices, such as, digital signal processors may be designated with a "low performance" classification. It should be appreciated that the classification of any particular master may be adjusted to accommodate various use cases, user behaviors, or operational scenarios. A particular processing device may behave as a high bandwidth master in certain scenarios and as a low bandwidth master in other scenarios. For example, in one use case, a camera may behave as a low bandwidth master if it is used by an application to detect movement across frames. In another use cases, the camera may behave as a high bandwidth master for imaging applications. In this regard, any of the SoC processing devices 114, 116, and 118 may be selectively classified as high bandwidth or low bandwidth on the basis of, for example, the memory footprint of the corresponding application in use and its bandwidth requirement.

As further illustrated in FIG. 1, the memory channel interleave granularity applied to memory transactions initiated by processing devices 114, 116, and 118 may be intelligently selected from a plurality of predefined interleave boundaries or granularities. While any number and numerical value of interleave granularities may be implemented depending on various parameters (e.g., DDR specifications, number of DDR channels, memory size, etc.), in an exemplary embodiment, the predefined interleave granularities are selected from boundary or granularity values of 256 B, 512 B, 1 kB, and 2 kB. As mentioned above, conventional channel interleaving is applied at a fixed sized boundary without regard to performance requirements, bandwidth requirements, memory data access sizes, etc. For example, many high-tier SoCs comprise eight DDR channels with a 256 B fixed interleave granularity. While a 256 B interleave granularity may advantageously meet the demands of certain high-performance masters (e.g., CPUs, GPUs) and efficiently balance traffic across all DDR channels, not all of the SoC processing devices and/or use cases implemented in system 100 may require this level of performance.

It should be appreciated that the system 100 may minimize power consumption and DDR energy for low-performance masters and/or certain types of memory transactions (e.g., reads/writes involving relatively small data accesses) by selecting from one or more interleave granularities having a higher numerical value than a default or performance value. In the above example involving interleave granularities of 256 B, 512 B, 1 kB, and 2 kB, the 256 B value may be selected for memory transactions involving high-performance masters or other use cases where performance and interleaving efficiency are desired. However, for low-performance masters and/or other types of memory transactions where power/energy efficiency is more optimal, any of the higher numerical values (512 B, 1 kB, and 2 kB) may be selected for the interleave granularity.

The selective adjustment of the interleave granuarlity may be implemented in various ways. In the embodiment of FIG. 1, one or more of the SoC processing devices 114, 116, and 118 may be operatively coupled to a memory management unit (MMU) and an address translator. For example, the SoC processing device 114 may be operatively coupled to MMU 120 and address translator 142. The SoC processing device 116 may be operatively coupled to MMU 122 and address translator 144. The SoC processing device 118 may be operatively coupled to MMU 124 and address translator 146. It should be appreciated that the MMUs 120, 122, and 124 may comprise separate memory management units, a system memory management unit, or may be incorporated in the respective processing device. Furthermore, the address translators 142, 144, and 146 may comprise separate components operatively coupled to the corresponding MMU or processing device or a dedicated address translator accessed by each of the MMUs or processing devices.

Figure 2:
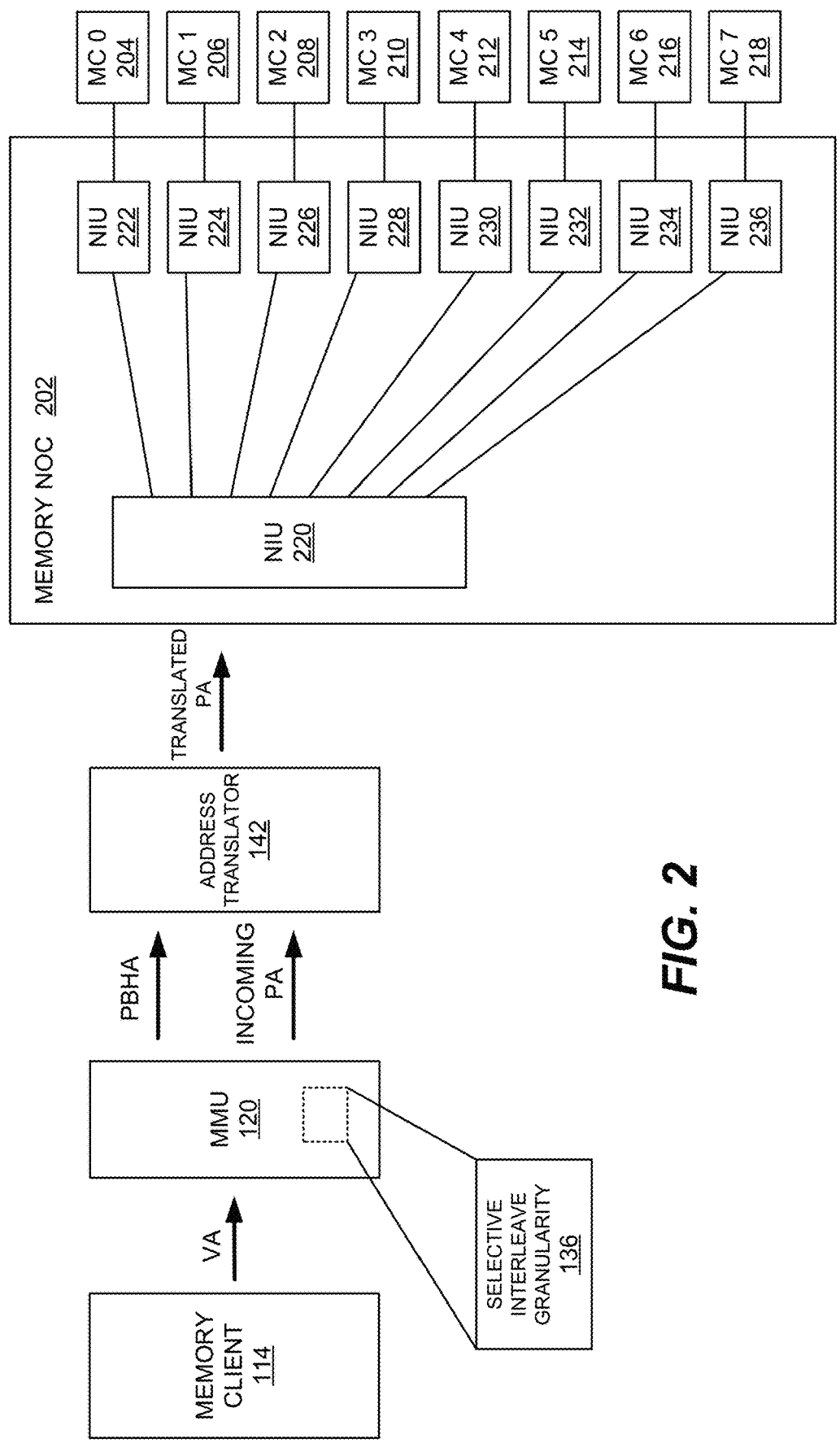
FIG. 2 is a combined block/flow diagram illustrating an exemplary method for dynamically adjusting interleave granularity in the system of FIG. 1.

FIG. 2 is a combined block/flow diagram illustrating the general operation of a single SoC processing device 114 with associated MMU 120 and address translator 142 in which interconnect 126 comprises a memory network on chip (MNoC) 202. The other SoC processing devices 116 and 118, MMUs 122 and 124, and address translators 144 and 146 may operate in a similar manner. In general, the SoC processing devices 114, 116, and 118 may be configured to perform processing operations with reference to virtual memory addresses. MMUs 120, 122, and 124 translate virtual memory addresses used by the SoC processing device 114, 116, and 118, respectively, into physical memory addresses used by the system memory (e.g., DDR memory 104) with reference to page tables that are stored in the system memory. MMUs 120, 122, and 124 comprise logic (e.g., hardware, software, or a combination thereof) for performing address translation for the corresponding SoC processing device. As known in the art, MMUs 120, 122, and 124 may comprise a corresponding translation buffer unit (TBU) and a translation control unit (TCU). The TBU may store recent translations of virtual memory to physical memory in, for example, translation look-aside buffers (TLBs).

If a virtual-to-physical address translation is not available in a TBU, then the corresponding TCU may perform a page table walk executed by a page table walker module (not shown). In this regard, the main functions of the TCU include address translation, memory protection, and attribute control. Address translation is a method by which an input address in a virtual address space is translated to an output address in a physical address space. Translation information may be stored in one or more page tables 402 (FIG. 4) that the MMU references to perform virtual-to-physical address translation. As known in the art, address translation may allow the memory clients to address a large physical address space. For example, a 32-bit processing device (i.e., a device capable of referencing $2^{32}$ address locations) can have its addresses translated such that the memory clients may reference a larger address space, such as a 36 bit address space or a 40 bit address space. Address translation may also allow processing devices to have a contiguous view of buffers allocated in memory, despite the fact that memory buffers are typically fragmented, physically non-contiguous, and scattered across the physical memory space.

Figure 4:
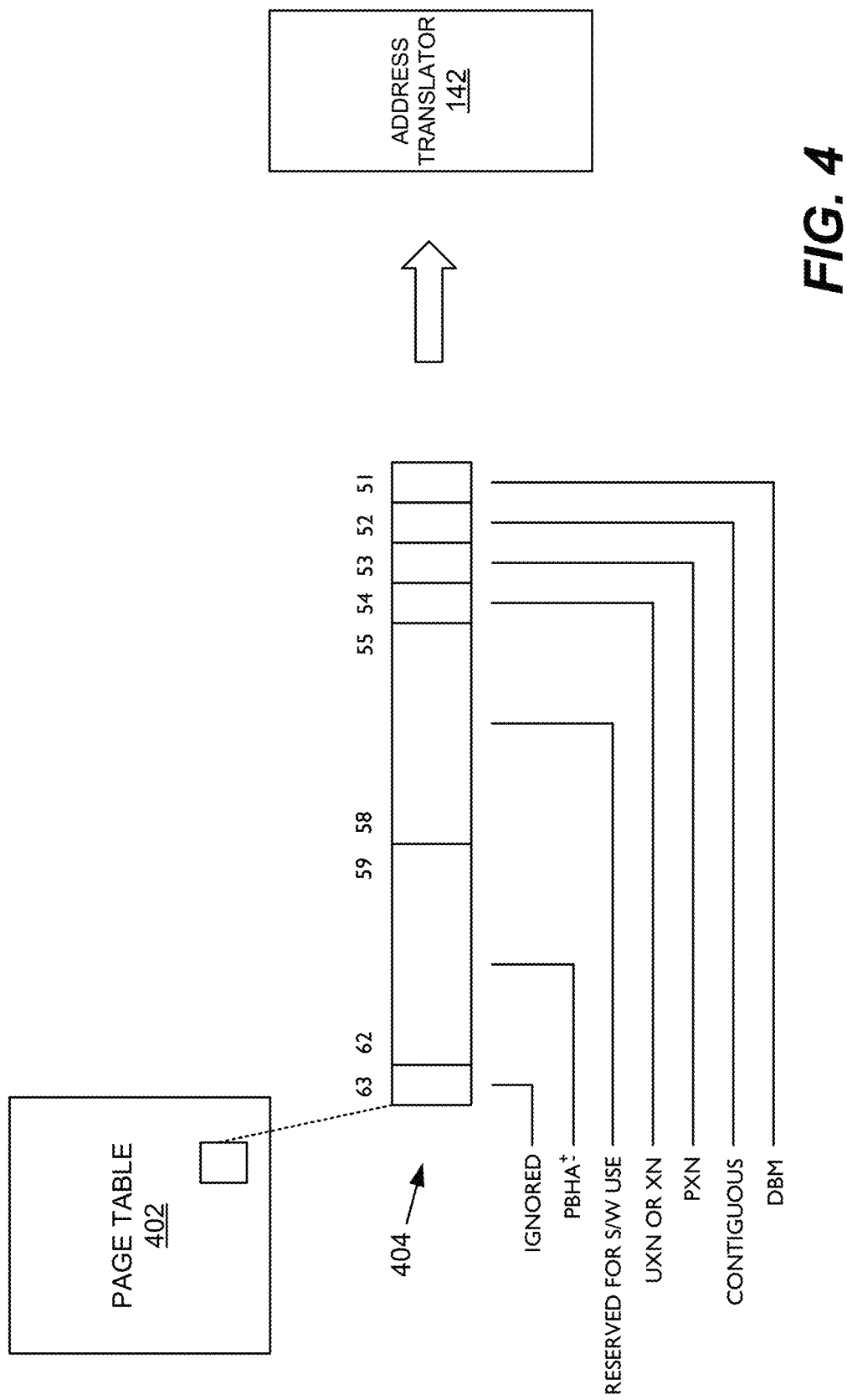
FIG. 4 is a data/flow diagram illustrating an exemplary data structure of page based hardware attributes for encoding a predetermined number of interleave granularities.

As illustrated in FIG. 4, a page table 402 may contain information necessary to perform address translation for a range of input addresses. Page tables may include a plurality of tables comprising page table entries (PTE). It should be appreciated that the page tables may include a set of sub-tables arranged in a multi-level "tree" structure. Each sub-table may be indexed with a sub-segment of the input address. Each sub-table may include translation table descriptors. There are three base types of descriptors: (1) an invalid descriptor, which contains no valid information; (2) table descriptors, which contain a base address to the next level sub-table and may contain translation information (such as access permission) that is relevant to all subsequent descriptors encountered during the walk; and (3) block descriptors, which contain a base output address that is used to compute the final output address and attributes/permissions relating to block descriptors.

The process of traversing page tables to perform address translation is known as a "page table walk." A page table walk is accomplished by using a sub-segment of an input address to index into the translation sub-table, and finding the next address until a block descriptor is encountered. A page table walk comprises one or more "steps." Each "step" of a page table walk involves: (1) an access to a page table, which includes reading (and potentially updating) it; and (2) updating the translation state, which includes (but is not limited to) computing the next address to be referenced. Each step depends on the results from the previous step of the walk. For the first step, the address of the first page table entry that is accessed is a function of the translation table base address and a portion of the input address to be translated. For each subsequent step, the address of the page table entry accessed is a function of the page table entry from the previous step and a portion of the input address. In this manner, the page table walk may comprise two stages. A first stage may determine an intermediate physical address. A second stage may involve resolving data access permissions at the end of which the physical address is determined.

As further illustrated in FIG. 1, the MMUs 120, 122, and 124 may comprise specially-configured logic (e.g., selective interleave granularity modules 136, 138, and 140, respectively) for intelligently selecting one of the plurality of predefined interleave granularities at the time of memory allocation (malloc). It should be appreciated that the selection of the interleave granularity may be implemented in various ways and based on various types of data. In an exemplary embodiment, the selected interleave granularity may be based on one or more of the following: a current power profile of the SoC 102 (e.g., power vs. performance profile); a current battery level of device incorporating the SoC 102, a bandwidth associated with the processing device requesting memory allocation; a memory footprint associated with the processing device requesting memory allocation; a current memory traffic level on one or more of DDR busses 106, 108, 110, and 112; a projected memory traffic level on one or more of DDR busses 106, 108, 110, and 112; a monitored user behavior; and a form factor of a device incorporating the SoC 102 (e.g., a tablet form factor, a smartphone form factor, a wearable form factor).

Regarding monitored user behavior data, the system 100 may monitor variations in DDR activity. For example, at certain times of the day, DDR activity may be higher than other times of the day. Certain types of masters and applications may tend to operate at the same time (e.g., video+wifi+display, modem+maps/navigation application), and the system 100 may employ various algorithms to predict future DDR traffic load based on this data. The system 100 may select and apply an interleave granularity having a lower numerical value for relatively higher-performance memory clients, use cases, or concurrency scenarios. The system 100 may select and apply an interleave granularity having a higher numerical value for relatively lower-performance memory clients, use cases, or concurrency scenarios.

Regarding a current battery level, it should be appreciated that the SoC 102 may be incorporated in various types of battery-powered portable computing devices (e.g., the below-described device 800 of FIG. 8). When the current battery level is below one or more thresholds, the system 100 may select an interleave granularity having a higher numerical value to reduce energy consumption.

Regarding different types of form factors, it should be appreciated that the SoC 102 may be designed for various types of portable computing devices. For example, in one form factor (e.g., a smartphone form factor, a wearable form factor), one of the higher-valued interleave granularities may be set as a default interleave granularity to reduce power consumption. In another form factor (e.g., a tablet form factor), it may be more advantageous to set the default interleave granularity to a lower value for performance reasons.

As illustrated in FIGS. 2 & 4, the MMUs 120, 122, and 124 may be configured to notify the address translators 142, 144, and 146, respectively, of the selected interleave granularity to enable the memory data to be interleaved at the appropriate boundary. It should be appreciated that the selected interleave granularity may be provided to the address translator in various ways. In one embodiment, the MMUs 120, 122, and 124 are configured to encode the selected interleave granularity, during memory allocation, in one or more specially-configured page descriptors or other physical address (PA) bits in the pages descriptors of a corresponding page. In an exemplary embodiment, the selected interleave granularity may be encoded in hardware page table translation data (e.g., page based hardware attributes (PBHAs) in the ARM architecture). Referring to FIGS. 2 & 4, it should be appreciated that the encoded interleave granularity may be provided to the corresponding address translator along with the physical addresses associated with DDR memory 104 (not shown). It should be appreciated that the address functionality (i.e., address translators 142, 144, 146) may comprise a dedicated block/logic, as illustrated in FIG. 2, although in additional embodiments the address translation functionality may be implemented by, for example, the MNoC 202. For example, instead of address translation via dedicated address translators 142, 144, and 146, the PBHAs or other PA bits may be driven to the corresponding NIU in the MNoC 202, which performs the address translation by ensuring that the selected interleave granularity is applied.

FIG. 4 is a data/flow diagram illustrating an exemplary data structure of upper attributes 404 for an exemplary page table 402. In an embodiment, one or more specially-configured bits of level-3 translation table descriptors (e.g., [62:59] in FIG. 4) may be used to encode the selected interleave granulality. It should be appreciated that alternative data structures, attributes, and/or page descriptors may be implemented.

FIG. 5 is an exemplary table 500 illustrating an embodiment in which the system 100 supports four predefined numerical values for the selectable interleave granularities (256 B, 512 B, 1 kB, and 2 kB—column 504). Column 502 illustrates the corresponding bit-level encoding, where the encoded value "00" designates the interleave numerical value 256 B, the encoded value "01" designates the interleave numerical value 512 B, the encoded value "10" designates the interleave numerical value 1 kB, and the encoded value "11" designates the interleave numerical value 2 kB. As described below in more detail, the address translators 142, 144, and 146 may use the encoded values in the page descriptors to determine the selected interleave granuarlity and, in response, translate the incoming physical address received from the corresponding MMUs 120, 122, and 124 in such a way to adjust the interleave granularity to the value encoded in the page descriptors. In the example of FIG. 5, column 506 illustrates the corresponding physical address manipulation to apply the selected interleave granularity.

Referring again to FIG. 2 and as mentioned above, the memory interconnect 126 may be implemented via MNoC 202. In this example, the system 100 employs eight DDR channels (CH0-CH7) to a DDR memory coupled to corresponding memory controllers 204, 206, 208, 210, 212, 214, 216, and 218, respectively. By contrast and for clarity, the embodiment of FIG. 1 employs four DDR channels with corresponding memory controllers 128, 130, 132, and 134. It should be appreciated, however, that any number of DDR channels with corresponding memory controllers may be implemented. As illustrated in FIG. 2, MNoC 202 comprises a plurality of network interface units (NIUs) for managing the network layer communication between the SoC processing devices 114, 116, and 118 and the memory controllers 204, 206, 208, 210, 212, 214, 216, and 218. The SoC processing devices 114, 116, and 118 interface with a dedicated initiating NIU. FIG. 2 illustrates one of the SoC processing devices 114 operatively coupled to initiating NIU 220, although it should be appreciated that the other SoC processing devices 116 and 118 are also coupled to dedicated initiating NIUs (not shown). A plurality of destination NIUs 222, 224, 226, 228, 230, 232, 234, and 236 are coupled to memory controllers 204, 206, 208, 210, 212, 214, 216, and 218, respectively. In this manner, each initiating NIU in the MNoC 202 is coupled to each of the destination NIUs 222, 224, 226, 228, 230, 232, 234, and 236.

Having described the structure and operation of the system 100 for selecting one of the predefined interleave granularities and providing the selected interleave granularity to the address translator, an exemplary embodiment of the operation of the address translators 1142, 144, and 146 will be described. In this example, the system 100 comprises eight DDR channels (CH0-CH7) as illustrated in FIG. 2. It is assumed that a 36-bit total physical address is being employed (i.e., PA[35:0] where each page is 4 kB. Therefore, PA[35:12] identifies a "page" and PA[11:0] identities a byte within a 4 kB page. Hardware interleaving by the NIUs is based on PA[10:8] (i.e., 256 B granularity). It should be appreciated that, based on the 8 possible values of PA[10:8], memory data may be connected to the eight DDR channels (CH0-CH7). In this manner, each 4 kB page may reside in every DDR channel by default. To implement the dynamic adjustment of the memory channel interleave granularity, the system 100 may perform memory allocation according to memory blocks rather than a single 4 kB page. The block size may be determined according to the following:

Block_Size=(Max Interleave Granularity)×
(# of DDR Channels)

In this example, where the maximum available interleave granularity is 2 kB and the system 100 supports eight DDR channels, the block size equals 16 kB (i.e., four pages of size 4 kB).

In this regard, memory allocation (Malloc) may reserve 16 kB (i.e., 4×4 kB) of continuous memory locations, which span PA[13:0]. As mentioned above, during memory allocation, one or more algorithms may determine what interleave granularity is best suited for that particular block based on various data inputs. The address translators 142, 144, and 146 perform in-line physical address translation on the incoming PA[35:0]. The incoming PA[35:0] may be translated to a new PA[35:0] (i.e., referred to as Trans_PA[35:0]). It should be appreciatd that the Trans_PA comprises the input to the initiating NIU 220 (FIG. 2), determining to which DDR channel the memory data is sent. Column 506 in FIG. 5 illustrates an exemplary address manipulation scheme for implementing the selected interleave granularities (column 504).

In a more specific example, assume the incoming physical address has the following value:
36'h87654EA10=2'b1000_0111_0110_0101_0100_
1111_1010_0001_0000

The above incoming physical address may be translated to the following value where the selected interleave granularity value is 1 kB (translated values shown in bold and italics):
2'b1000_0111_0110_0101_0100_*1111_0110_0001*_
0000

The above incoming physical address may be translated to the following value where the selected interleave granularity value is 2 kB (translated values shown in bold and italics):
2'b1000_0111_0110_0101_0100_*1101_0110_0001*_
0000

Figure 6:
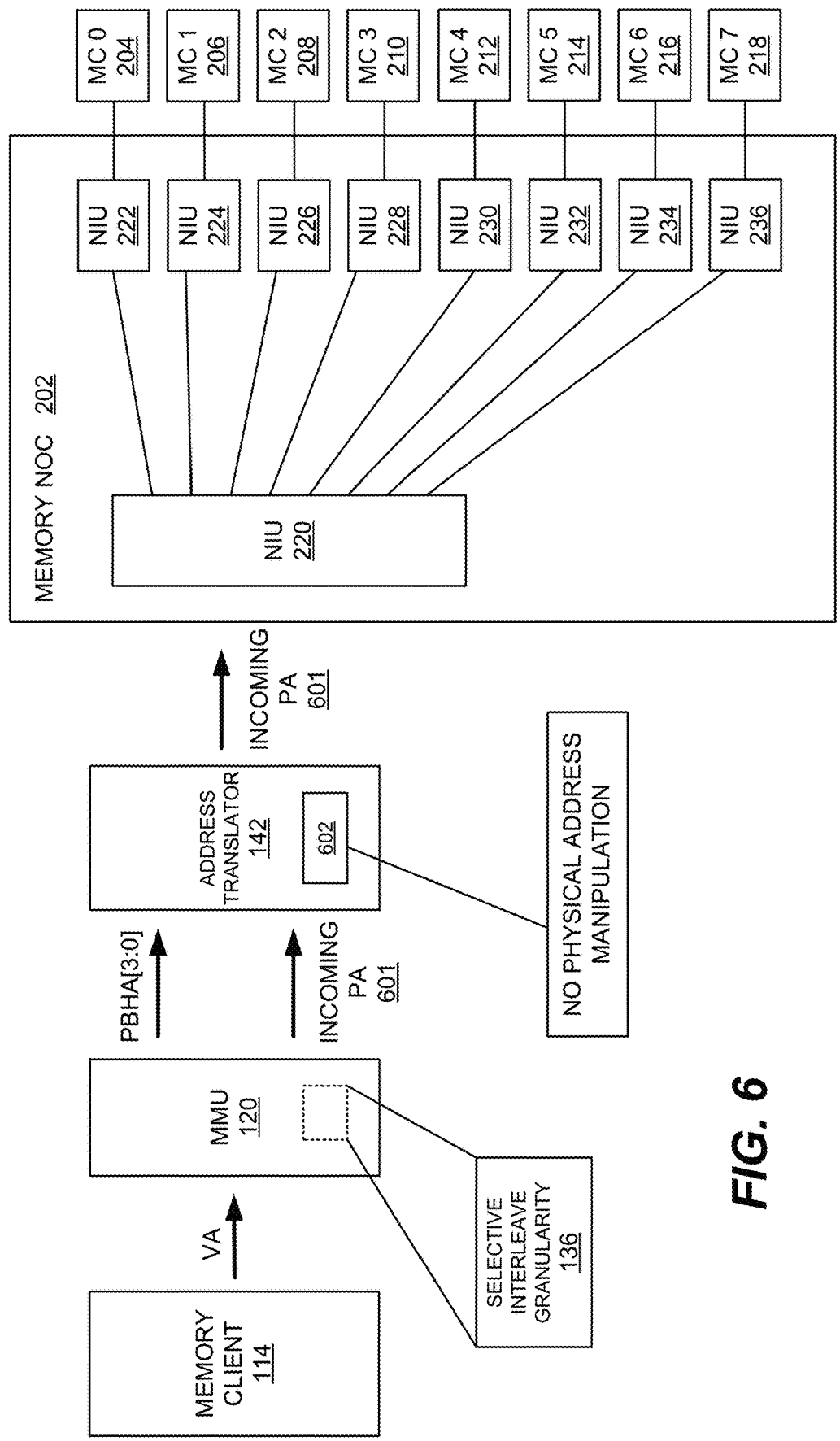
FIG. 6 is a block/flow diagram illustrating the operation of the address translator of FIG. 1 to provide high-performance memory access without performing physical address translation.

To further illustrate the potential power/energy savings of using dynamic adjustment of memory channel interleave granularity, another example will be described with reference to FIGS. 6 and 7 in which a memory transaction involves a relatively small chunk of data (e.g., 2 kB of memory data). FIG. 6 illustrates the operation of the system 100 in which the selected interleave granularity is the default value of 256 B. In FIG. 6, an encoded value of "00" (column 502—FIG. 5) designates the default interleave value, which triggers the address translator 142 to perform default interleaving without performing in-line physical address manipulation (block 602). In this case, an incoming physical address 601 is received from the MMU 120 and passed on to MNoC 202 (without physical address manipulation), thereby interleaving the 2 kB memory data access such that all eight DDR channels (CH0-CH7) are activated (i.e., 256 B×8 channels=2 kB memory data access).

Figure 7:
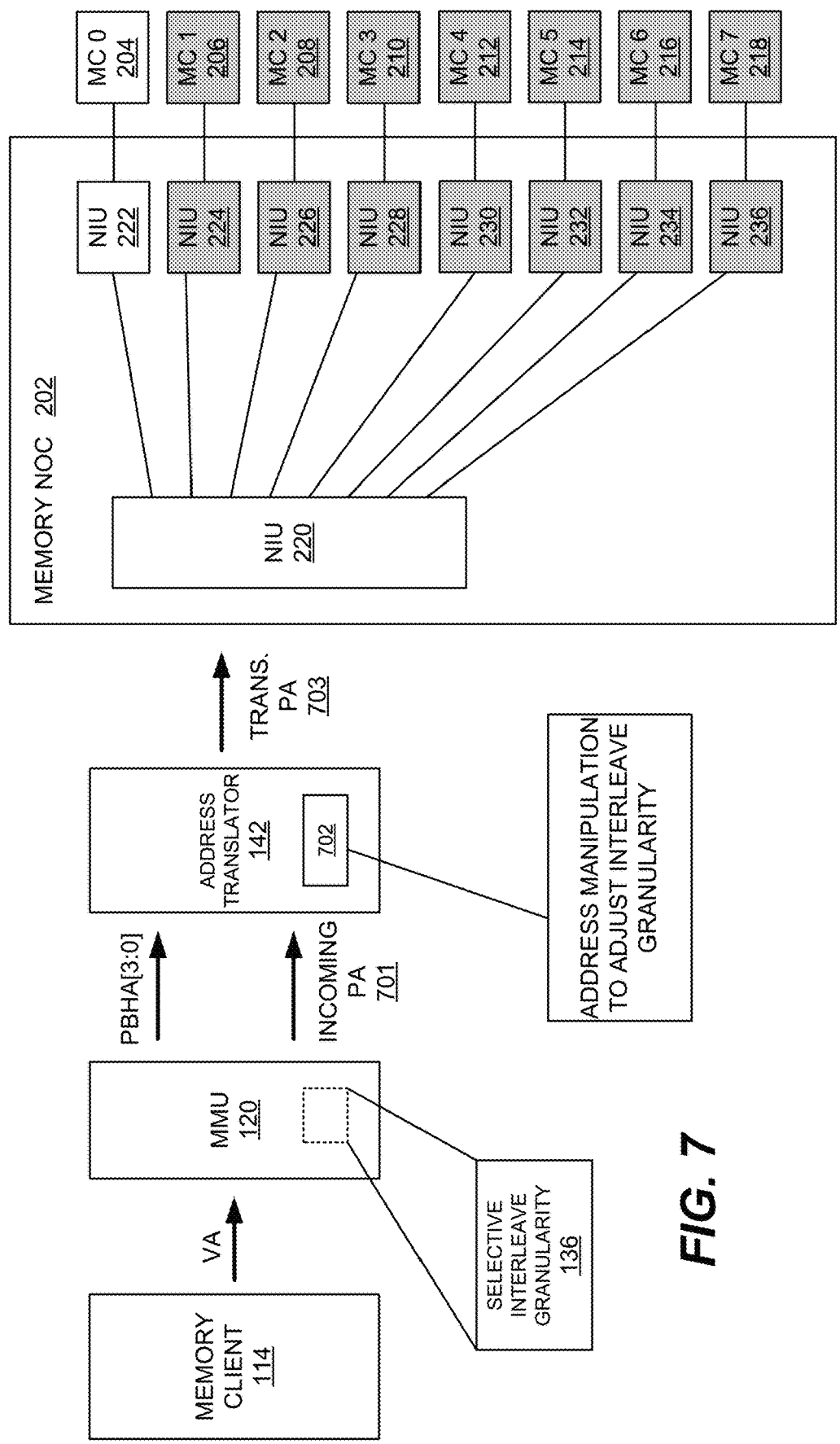
FIG. 7 is a block/flow diagram illustrating the operation of the address translator of FIG. 1 to provide power-efficient memory access by dynamically adjusting memory channel interleave granularity.

In contrast, FIG. 7 illustrates a power/energy-efficient operation of the system 100 in which the 2 kB interleave granularity is selected for the 2 kB memory data access. In FIG. 7, the selective interleave granularity module 136 determines that a relatively smaller data access size (2 kB) is better suited for a higher interleave granularity. The selective interleave granularity module 136 encodes the value "11" in the PBHAs. The address translator 142 receives the PBHAs with an incoming physical address 701 from the MMU 120. In response, the address translator 142 determines that the interleave granularity should be adjusted from the default value (256 B) to the new value (2 kB) and, at block 702, the incoming physical address bits are manipulated to generate a translated physical address 703 in the manner described above to apply the 2 kB interleave granularity. In contrast to the 256 B example of FIG. 6, in this case, the address manipulation enables the full 2 kB memory data to be sent to only one memory channel (MC0), thereby yielding power/energy saving by, for example, avoiding DRAM activation of the seven other memory channels (MC1-MC7, which are shown as greyed-out).

It should be appreciated that additional sources of power/energy saving may be due to clock gating associated with unused channels (e.g., an entire path to DDR memory 104) and/or fewer clock-gated wires and/or buffers in, for example, memory interconnect 126 or memory NoC 202. DRAM activation power is dominant power. For example, given the same write/read bandwidth, DRAM power may be proportional to the number of DRAM page activates, particularly for low bandwidth cases. For smaller data acces sizes (e.g., 2 kB), 256 B interleaving gives rise to 8 page activate commands, split into 8 paths (last level cache controller (LLCC) to memory controller to PHY to DRAM). Where interleaving granularity is 1 kB, then only 2 DRAM pages need to be activated. It should be appreciated that these benefits may be particulary significant in situations where data access size is relatively small and bandwidth is relatively low. Furthermore, in a design, the clock network begins toggling (and consuming power) before the first transaction arrives and after the request is served. This is because of hysteresis in clock network gating, which may be pronounced in cases of smaller data accesses where the percentage of (design active)/(total clock enabled) gets smaller.

Figure 3:
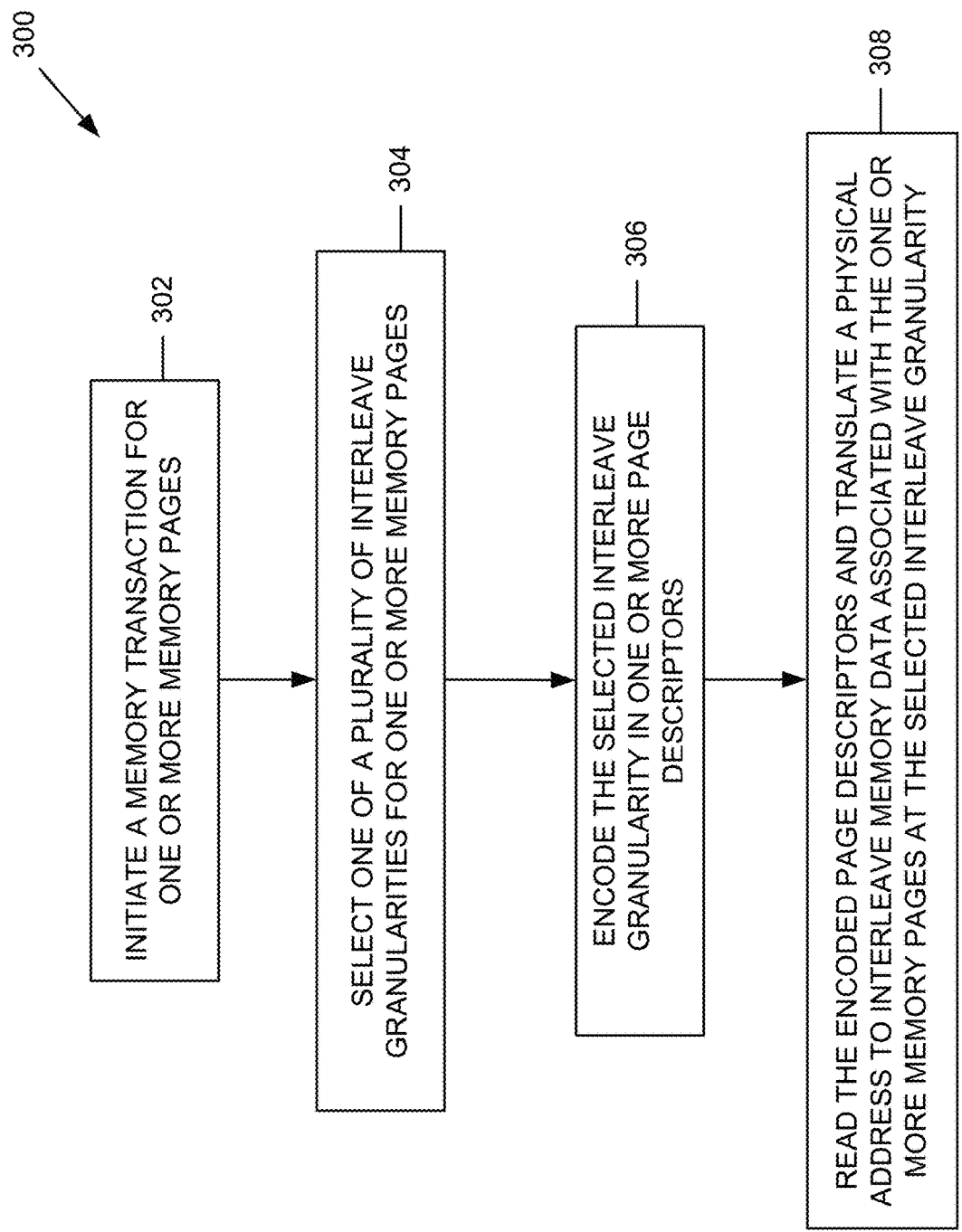
FIG. 3 is a flowchart illustrating an embodiment of a method for dynamically adjusting interleave granularity.

FIG. 3 is a flowchart illustrating an embodiment of a method 300 for dynamically adjusting memory channel interleave granularity in the system 100. At block 302, a memory allocation is initiated for one or more memory pages. One of the memory clients (e.g., SoC processing devices 114, 116, and 118) may request the memory allocation from, for example, an MMU 120. As mentioned above, in an embodiment, the system 100 may perform memory allocation according to memory blocks rather than a single memory page. The block size may be equal to the maximum interleave granularity value multiplied by a number of available memory channels. At block 304, the MMU 120 selects one of a plurality of interleave granularities for the one or more memory pages. As described above, the selected interleave granularity may be determined based on various types of data inputs. At block 306, the MMU 120 encodes the selected interleave granularity in one or more page descriptors (e.g., page based hardware attributes associated with the one or more memory pages. At block 308, for any subsequent memory access to the one or more memory pages, the address translator 142 may read the encoded page descriptor(s) to determine the selected interleave granularity and translate a physical address to interleave memory data associated with the one or more memory pages at the selected interleave granularity.

Figure 8:
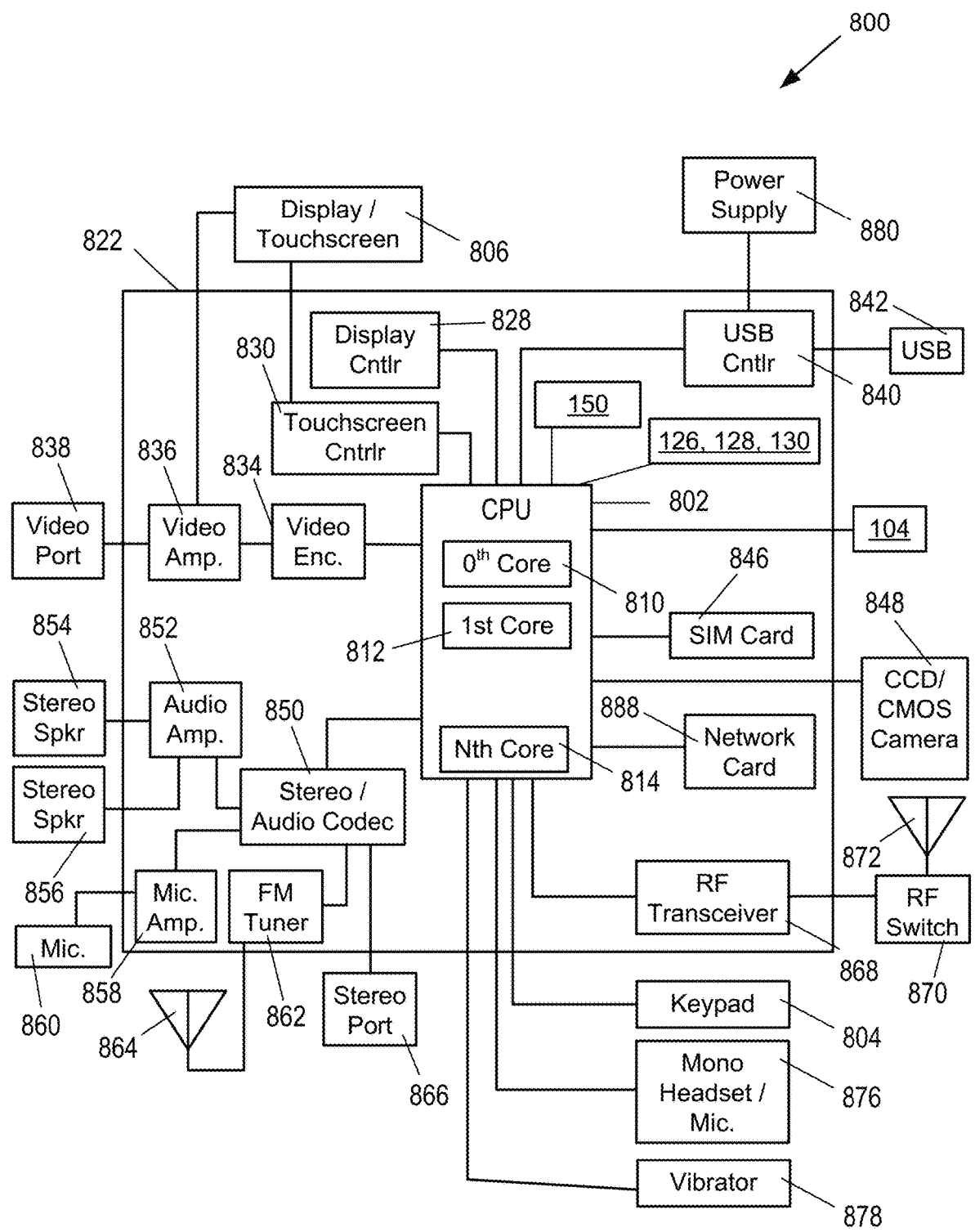
FIG. 8 is a block diagram of an embodiment of a portable computing device that may incorporate the systems and methods of FIGS. 1-7.

FIG. 8 is a block diagram of an embodiment of a portable computing device 800 that may incorporate the systems and methods of FIGS. 1-7. PCD 800 may comprise a smart phone, a tablet computer, or a wearable device (e.g., a smart watch, a fitness device, etc.). It will be readily appreciated that certain components of the system 100 are included on the SoC 822 (e.g., interconnect 132, MNoC 300, address translators 142, 144 and 146, SoC processing devices 114, 116 and 118, and MMUs 120, 122 and 124) while other components (e.g., the system memory 104) are external components coupled to the SoC 822. The SoC 822 may include a multicore CPU 802. The multicore CPU 802 may include a zeroth core 810, a first core 812, and an Nth core 814. One of the cores may comprise the application processor 102 with one or more of the others comprising a CPU, a graphics processing unit (GPU), etc.

A display controller 828 and a touch screen controller 830 may be coupled to the CPU 802. In turn, the touch screen display 807 external to the on-chip system 822 may be coupled to the display controller 828 and the touch screen controller 830.

FIG. 8 further shows that a video encoder 834, e.g., a phase alternating line (PAL) encoder, a sequential color a memoire (SECAM) encoder, or a national television system(s) committee (NTSC) encoder, is coupled to the multicore CPU 802. Further, a video amplifier 836 is coupled to the video encoder 834 and the touch screen display 806. Also, a video port 838 is coupled to the video amplifier 836. As shown in FIG. 8, a universal serial bus (USB) controller 840 is coupled to the multicore CPU 802. Also, a USB port 842 is coupled to the USB controller 840. A subscriber identity module (SIM) card 846 may also be coupled to the multicore CPU 802.

Further, as shown in FIG. 8, a digital camera 848 may be coupled to the multicore CPU 802. In an exemplary aspect, the digital camera 848 is a charge-coupled device (CCD) camera or a complementary metal-oxide semiconductor (CMOS) camera.

As further illustrated in FIG. 8, a stereo audio coder-decoder (CODEC) 850 may be coupled to the multicore CPU 802. Moreover, an audio amplifier 852 may be coupled to the stereo audio CODEC 850. In an exemplary aspect, a first stereo speaker 854 and a second stereo speaker 856 are coupled to the audio amplifier 852. FIG. 8 shows that a microphone amplifier 858 may be also coupled to the stereo audio CODEC 850. Additionally, a microphone 860 may be coupled to the microphone amplifier 858. In a particular aspect, a frequency modulation (FM) radio tuner 862 may be coupled to the stereo audio CODEC 850. Also, an FM antenna 864 is coupled to the FM radio tuner 862. Further, stereo headphones 866 may be coupled to the stereo audio CODEC 850.

FIG. 8 further illustrates that a radio frequency (RF) transceiver 868 may be coupled to the multicore CPU 802. An RF switch 870 may be coupled to the RF transceiver 868 and an RF antenna 1672. A keypad 804 may be coupled to the multicore CPU 802. Also, a mono headset with a microphone 876 may be coupled to the multicore CPU 802. Further, a vibrator device 878 may be coupled to the multicore CPU 802.

FIG. 8 also shows that a power supply 880 may be coupled to the on-chip system 822. In a particular aspect, the power supply 880 is a direct current (DC) power supply that provides power to the various components of the PCD 800 that require power. Further, in a particular aspect, the power supply is a rechargeable DC battery or a DC power supply that is derived from an alternating current (AC) to DC transformer that is connected to an AC power source.

FIG. 8 further indicates that the PCD 800 may also include a network card 888 that may be used to access a data network, e.g., a local area network, a personal area network, or any other network. The network card 888 may be a Bluetooth network card, a WiFi network card, a personal area network (PAN) card, a personal area network ultra-low-power technology (PeANUT) network card, a television/cable/satellite tuner, or any other network card well known in the art. Further, the network card 888 may be incorporated into a chip, i.e., the network card 888 may be a full solution in a chip, and may not be a separate network card 888.

As depicted in FIG. 8, the touch screen display 806, the video port 838, the USB port 842, the camera 848, the first stereo speaker 854, the second stereo speaker 856, the microphone 860, the FM antenna 864, the stereo headphones 866, the RF switch 870, the RF antenna 872, the keypad 874, the mono headset 876, the vibrator 878, and the power supply 880 may be external to the on-chip system 822.

Alternative embodiments will become apparent to one of ordinary skill in the art to which the invention pertains without departing from its spirit and scope. Therefore, although selected aspects have been illustrated and described in detail, it will be understood that various substitutions and alterations may be made therein without departing from the spirit and scope of the present invention, as defined by the following claims.

What is claimed is:

1. A method for dynamically adjusting memory channel interleave granularity, the method comprising:

initiating a memory allocation for one or more memory pages;

selecting one of a plurality of interleave granularities for the one or more memory pages;

encoding the selected interleave granularity in one or more page descriptors associated with the one or more memory pages; and translating a physical address to interleave memory data associated with the one or more memory pages at the selected interleave granularity, wherein the one or more memory pages comprises a block of memory pages having a block size equal to a maximum interleave granularity multiplied by a number of available memory channels.

2. The method of claim 1, wherein the selected interleave granularity is based on one or more of a current power profile, a current battery level, a bandwidth associated with the memory client, a memory footprint associated with the memory client, a current memory traffic level, a projected memory traffic level, a monitored user behavior, and a device form factor.

3. The method of claim 1, wherein the selecting the one of the plurality of interleave granularities comprises: determining a memory data access size.

4. The method of claim 3, wherein the selecting the one of the plurality of interleave granularities comprises: adjusting a current interleave granularity to a larger interleave granularity if the memory data access size is below a threshold.

5. The method of claim 3, wherein the selecting the one of the plurality of interleave granularities comprises: adjusting a current interleave granularity to a smaller interleave granularity if the memory data access size is above a threshold.

6. The method of claim 1, wherein the translating the physical address to interleave the memory data associated with the one or more memory pages at the selected interleave granularity comprises a network interface unit in a memory interconnect manipulating one or more physical address bits.

7. A system for dynamically adjusting memory channel interleave granularity, the system comprising:
means for initiating a memory allocation for one or more memory pages;
means for selecting one of a plurality of interleave granularities for the one or more memory pages;
means for encoding the selected interleave granularity in one or more page descriptors associated with the one or more memory pages; and
means for translating a physical address to interleave memory data associated with the one or more memory pages at the selected interleave granularity, wherein the one or more memory pages comprises a block of memory pages having a block size equal to a maximum interleave granularity multiplied by a number of available memory channels.

8. The system of claim 7, wherein the selected interleave granularity is based on one or more of a current power profile, a current battery level, a bandwidth associated with the memory client, a memory footprint associated with the memory client, a current memory traffic level, a projected memory traffic level, a monitored user behavior, and a device form factor.

9. The system of claim 7, wherein the means for selecting the one of the plurality of interleave granularities comprises: means for determining a memory data access size.

10. The system of claim 9, wherein the means for selecting the one of the plurality of interleave granularities comprises:
means for adjusting a current interleave granularity to a larger interleave granularity if the memory data access size is below a threshold.

11. The system of claim 9, wherein the means for selecting the one of the plurality of interleave granularities comprises:
means for adjusting a current interleave granularity to a smaller interleave granularity if the memory data access size is above a threshold.

12. The system of claim 7, wherein the means for translating the physical address to interleave the memory data associated with the one or more memory pages at the selected interleave granularity comprises:
a memory interconnect means for manipulating one or more physical address bits.

13. A system for dynamically adjusting memory channel interleave granularity, the system comprising:
a plurality of memory clients electrically coupled to each of a plurality of memory channels via an interconnect;
a memory management unit (MMU) for receiving a memory allocation request for one or more memory pages from one of the plurality of memory clients and, in response, selecting one of a plurality of interleave granularities for the one or more memory pages, wherein the one or more memory pages comprises a block of memory pages having a block size equal to a maximum interleave granularity multiplied by a number of available memory channels; and
an address translator for translating a physical address to interleave memory data associated with the one or more memory pages at the selected interleave granularity.

14. The system of claim 13, wherein the selected interleave granularity is encoded in one or more page based hardware attributes.

15. The system of claim 14, wherein the selected interleave granularity matches a double data rate (DDR) page size.

16. The system of claim 13, wherein the selected interleave granularity is based on one or more of a current power profile, a current battery level, a bandwidth associated with the memory client, a memory footprint associated with the memory client, a current memory traffic level, a projected memory traffic level, a monitored user behavior, and a device form factor.

17. The system of claim 13, wherein the MMU selects the one of the plurality of interleave granularities by adjusting a current interleave granularity to a larger interleave granularity if the memory data access size is below a threshold.

18. The system of claim 13, wherein the MMU selects the one of the plurality of interleave granularities by adjusting a current interleave granularity to a smaller interleave granularity if the memory data access size is above a threshold.

19. The system of claim 13, wherein the address translator resides in the memory interconnect and translates the physical address by manipulating one or more physical address bits.

20. The system of claim 13, wherein the plurality of memory clients, the MMU, and the address translator reside on a system on chip (SoC) electrically coupled to a double data rate (DDR) memory via the plurality of memory channels.

21. The system of claim 13, wherein the plurality of memory clients comprise one or more of a central processing unit (CPU), a graphics processing unit (GPU), and a digital signal processor.

22. The system of claim 13, wherein the address translator manipulates one or more physical address bits based on one or more page descriptors.

23. A computer program embodied in a non-transitory computer readable medium and executed by a processor for dynamically adjusting memory channel interleave granularity, the computer program comprising logic configured to:
initiate a memory allocation for one or more memory pages;
select one of a plurality of interleave granularities for the one or more memory pages;
encode the selected interleave granularity in one or more page descriptors associated with the one or more memory pages; and
translate a physical address to interleave memory data associated with the one or more memory pages at the selected interleave granularity, wherein the one or more memory pages comprises a block of memory pages having a block size equal to a maximum interleave granularity multiplied by a number of available memory channels.

24. The computer program of claim 23, wherein the selected interleave granularity is based on one or more of a current power profile, a current battery level, a bandwidth associated with the memory client, a memory footprint associated with the memory client, a current memory traffic level, a projected memory traffic level, a monitored user behavior, and a device form factor.

25. The computer program of claim 23, wherein the logic configured to select the one of the plurality of interleave granularities comprises logic configured to determine a memory data access size.

26. The computer program of claim 25, wherein the logic configured to select the one of the plurality of interleave granularities comprises logic configured to adjust a current interleave granularity to a larger interleave granularity if the memory data access size is below a threshold.

27. The computer program of claim 25, wherein the logic configured to select the one of the plurality of interleave granularities comprises logic configured to adjust a current interleave granularity to a smaller interleave granularity if the memory data access size is above a threshold.

* * * * *